United States Patent [19]

Koshute

[11] Patent Number: 5,332,763

[45] Date of Patent: Jul. 26, 1994

[54] STABLE DISPERSIONS AND THEIR USE IN THE PREPARATION OF POLYURETHANE FOAMS

[75] Inventor: Mark A. Koshute, Beaver, Pa.

[73] Assignee: Miles Inc., Pittsburgh, Pa.

[21] Appl. No.: 911,838

[22] Filed: Jul. 10, 1992

[51] Int. Cl.$^5$ .......................... C08J 9/00; C08G 18/32
[52] U.S. Cl. ........................................ 521/129; 521/65; 521/130; 521/159; 521/163; 521/164; 528/20; 528/44; 528/48; 528/61; 528/65
[58] Field of Search ............... 521/129, 130, 159, 163, 521/164, 65; 528/20, 44, 48, 61, 65

[56] References Cited

U.S. PATENT DOCUMENTS

| | | | |
|---|---|---|---|
| 3,325,421 | 6/1967 | Muller | 252/308 |
| 4,042,537 | 8/1977 | Dahm et al. | 521/128 |
| 4,089,835 | 5/1978 | König et al. | 521/137 |
| 4,305,857 | 12/1981 | Reischl | 524/762 |
| 4,305,858 | 12/1981 | Reischl | 524/762 |

*Primary Examiner*—John Kight, III
*Assistant Examiner*—Duc Truong
*Attorney, Agent, or Firm*—Joseph C. Gil; Godfried R. Akorli; N. Denise Brown

[57] ABSTRACT

The present invention relates to an improved process for preparing foams comprising reacting polyisocyanates with an in situ produced stable low solids dispersion of polyureas and/or polyhydrazodicarbonamides in a hydroxyl-group-containing material as a dispersing agent by reacting:

(a) organic polyisocyanates with
(b) a member selected from the group consisting of (i) polyamines containing primary and/or secondary amino groups, (ii) hydrazines, (iii) hydrazides, or (iv) mixtures thereof, in
(c) said hydroxyl-group-containing material.

2 Claims, No Drawings

STABLE DISPERSIONS AND THEIR USE IN THE PREPARATION OF POLYURETHANE FOAMS

BACKGROUND OF THE INVENTION

Stable dispersions for use in manufacturing polyurethanes are known in the art. One particular family of said dispersions which have met with substantial commercial success are those prepared by a continuous process of reacting an organic polyisocyanate with polyamines containing primary and/or secondary amino groups and/or hydrazines and/or hydrazides in the presence of a hydroxyl-group containing material, as the dispersing agent. See, e.g. U.S. Pat. Nos. 4,042,537, 4,089,835, 4,305,857 and 4,305,858. While these commercially available dispersions yield polyurethane foams having excellent physical properties, it would be desirable if even further improvements could be realized.

Typically, the dispersions contain from 20 to 40% by weight solids. German Auslegesschrift No. 1,260,142 describes of polyhydrazodicarbonamide in polypropylene glycol having a solids content of 10 or 20% and viscosity of 10,000 (200,000) cP at 25° C.

The present invention is directed to an improvement of the stable dispersions and is more particularly directed to their use in the manufacture of polyurethane foams. The resultant foams are generally characterized by significantly improved physical properties.

SUMMARY OF THE INVENTION

In accordance with the foregoing, the present invention encompasses an improved process for preparing flexible foams comprising reacting a polyisocyanate with an in situ formed dispersion of polyureas and/or polyhydrazodicarbonamides in a hydroxyl-group-containing material, as a dispersing agent by reacting:

(a) an organic polyisocyanate with
(b) a member selected from the group consisting of (i) a polyamine containing primary and/or secondary amino groups, (ii) a hydrazine, (iii) a hydrazide, and (iv) a mixture thereof, in
(c) a hydroxyl-group-containing material wherein the hydroxyl group is secondary in an instance when (b) contains a primary hydroxyl group; the improvement wherein the dispersion is of an in situ formed, low solids content.

Also encompassed by the invention are the foams prepared therewith. By the term "in situ formed" herein is meant that dispersions of low solid content are obtained during the preparation thereof. This distinguishes the dispersions of this invention from art-related dispersions of low solid which can be obtained by reducing the solids content of dispersions which have already been formed.

Surprisingly, it has been found that by the use of the in situ formed low solids dispersions of this invention, one is able to produce, foams having improved load bearing capacity and cell opening per unit weight of filler.

DETAILED DESCRIPTION OF THE INVENTION

As afore-stated, the foams of the present invention are prepared by reacting a polyisocyanate with an in situ formed low solids dispersion of polyureas and/or polyhydrazodicarbonamides in a hydroxyl-group-containing material, as a dispersing agent.

In accordance with this invention, the useful dispersions are of in situ formed, low solids content which can be from 1 to 19 percent and more preferably 7 to 11 percent by weight of solids (in the form of polyureas and/or polyhydrazodicarbonamides), at relatively low viscosities. In most cases, the viscosities of the dispersions of the present invention are less than 30,000 mPa.s at 25° C. and are preferably less than about 5000 mPa.s at 25° C. In the preparation of the dispersions, the starting materials are selected and reacted in such a manner as will produce low solids, in situ.

Di- and/or polyisocyanate may be used herein. Suitable polyisocyanates include aliphatic, cycloaliphatic, araliphatic, aromatic and heterocyclic polyisocyanates of the type described, for example, by W. Siefken in *Justus Liebigs Annalen der Chemie*, 562, pages 75 to 136. Specific examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate, and mixtures of these isomers; 1-isocyanato-3,3,5-trimethyl-5-isocyanatomethyl cyclohexane (see, e.g. German Auslegesschrift No. 1,202,785 and U.S. Pat. No. 3,401,190); 2,4- and 2,6-hexahydrotolylene diisocyanate and mixtures of these isomers; hexahydro-1,3- and/or 1,4-phenylene diisocyanate; perhydro-2,4'- and/or 4,4'-diphenyl methane diisocyanate; 1,3- and 1,4-phenylene diisocyanate; 2,4- and 2,6-tolylene diisocyanate and mixtures of these isomers; diphenyl methane-2,4'- and/or 4,4'-diisocyanate; naphthylene-1,5-diisocyanate; triphenyl methane-4,4',4''-triisocyanate; polyphenyl polymethylene polyisocyanates of the type which may be obtained by condensing aniline with formaldehyde, followed by phosgenation, and which are described, for example, in British Patent Nos. 878,430 and 848,671; and p-isocyanatophenyl sulphonyl isocyanates of the type described in U.S. Pat. No. 3,454,606; perchlorinated aryl polyisocyanates of the type described, for example, in U.S. Pat. No. 3,227,138; polyisocyanates containing carbodiimide groups of the type described in U.S. Pat. No. 3,152,162; diisocyanates of the type described in U.S. Pat. No. 3,492,330; polyisocyanates containing allophanate groups of the type described, for example, in British Patent No. 994,890, Belgian Patent No. 761,626 and published Dutch Patent Application No. 7,102,524, polyisocyanates containing isocyanurate groups of the type described, for example, in U.S. Pat. No. 3,002,973, in German Patent Nos. 1,022,789; 1,222,067 and 1,027,394, and in German Offenlegungsschriften Nos. 1,929,034 and 2,004,048; polyisocyanates containing urea groups of the type described in German Patent No. 1,230,778; polyisocyanates containing biuret groups of the type described, for example, in German Patent No. 1,101,394; U.S. Pat. Nos. 3,124,605 and 3,201,372 and in British Patent No. 889,050; polyisocyanates obtained by telomerization reactions of the type described, for example, in U.S. Pat. No. 3,654,106; polyisocyanates containing ester groups of the type described, for example, in British Patent Nos. 965,474 and 1,072,956, in U.S. Pat. No. 3,567,763 and in German Patent No. 1,231,688; reaction products of the above-mentioned isocyanates with acetals as described in German Patent No. 1,072,385; and polyisocyanates containing polymeric fatty acid radicals of the type described in U.S. Pat. No. 3,455,883.

It is also possible to use the isocyanate-group-containing distillation residues accumulating in the production of isocyanates on a commercial scale, optionally in solution in one or more of the aforementioned polyisocyanates. It is also possible to use mixtures of the aforementioned polyisocyanates.

In general, it is particularly preferred to use readily available polyisocyanates, such as 2,4- and 2,6-tolylene diisocyanates and mixtures of these isomers ("TDI"); polyphenyl polymethylene polyisocyanates of the type obtained by condensing aniline with formaldehyde, followed by phosgenation ("crude MDI") and, polyisocyanates containing carbodiimide groups, allophanate groups, isocyanurate groups; urea groups or biuret groups ("modified polyisocyanates"). TDI is presently the most preferred.

Prepolymers of isocyanates including the reaction product of polyisocyanate and low and/or high molecular weight compounds having active hydrogen groups such as hydroxyl or amino groups are useful herein.

As afore-stated, the di- and/or polyisocyanates can be reacted with a compound containing at least one hydroxyl group to produce an isocyanate prepolymer which is preferably a liquid reaction product containing from about 5 to about 45% by weight isocyanate groups and preferably from about 25 to about 35% by weight.

The hydroxyl-group containing compounds are preferably selected from the group consisting of polyethers, polyesters, polyester amides, polycarbonates and mixtures thereof. The polyisocyanates and hydroxyl group-containing compounds can be selected so that the resultant products contain ionic groups.

Polyethers are preferred for use in making the liquid reaction product and preferably contain from 1 to 8 and more preferably from 2 to 6 primary and/or secondary hydroxyl groups. The polyethers preferably have molecular weights of from 200 to 16,000 and most preferably from 500 to 12,000. Polyethers of this type may be obtained in known manner by reacting starter compounds containing reactive hydrogen atoms with alkylene oxides, such as ethylene oxide, propylene oxide, butylene oxide, styrene oxide, tetrahydrofuran or epichlorohydrin, or with mixtures of these alkylene oxides. In many cases, it is preferred to use polyethers of the type which contain predominant amounts of primary OH groups.

Suitable starter compounds containing reactive hydrogen atoms include water, methanol, ethanol, ethylene glycol, 1,2- or 1,3-propylene glycol, 1,4- or 2,3-butylene glycol, 1,6-hexanediol, 1,8-octanediol, neopentyl glycol, 1,4-bis-hydroxymethyl cyclohexane, 2-methyl-1,3-propanediol, glycerol, trimethylolpropane, 1,2,6-hexanetriol, 1,2,4-butanetriol, trimethylolethane, pentaerythritol, mannitol, sorbitol, methylglycoside, cane sugar, phenol, isononylphenol, resorcinol, hydroquinone, 1,2,2- and 1,1,3-tris(hydroxyphenyl)ethane, ammonia, methylamine, ethylene diamine, tetra- or hexamethylene diamine, diethylene triamine, ethanolamine, diethanolamine, triethanolamine, aniline, phenylene diamine, 2,4- and 2,6-diaminotoluene and polyphenyl-polymethylenepolyamines of the type obtained by condensing aniline with formaldehyde. In addition, resin-like materials of the phenol and resole type may also be used as starters. Polyethers modified with vinyl polymers, e.g., the compounds obtained by polymerizing styrene and acrylonitrile in the presence of polyethers (U.S. Pat. Nos. 3,383,151, 3,304,273, 3,523,093, and 3,110,695 and German Patent Specification No. 1,142,536) and polybutadienes which contain OH groups are also suitable.

The polyesters containing hydroxyl groups which can be used to prepare the liquid non-ionic reaction product generally have molecular weights of from 400 to 16,000 and preferably from 500 to 12,000 and include reaction products of polyhydric (preferably dihydric and, optionally, trihydric) alcohols with polybasic (preferably dibasic) carboxylic acids. Instead of using free polycarboxylic acids, it is also possible to use the corresponding polycarboxylic acid esters of lower alcohols or mixtures thereof for producing the polyesters. The polycarboxylic acids may be aliphatic, cycloaliphatic, aromatic and/or heterocyclic and may be substituted (for example by halogen atoms) and/or unsaturated. Examples of suitable polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethyl ester and terephthalic acid bis-glycol ester. Examples of suitable polyhydric alcohols include ethylene glycol, 1,2- and 1,3-propylene glycol, 1,4- and 2,3-butylene glycol, 1,6-hexanediol, 1,8-octanediol, neopentyl glycol, cyclohexane dimethanol 1,4-bis(hydroxymethyl)cyclohexane, 2-methyl-1,3-propanediol, glycerol, trimethylolpropane, 1,2,6-hexanetriol, 1,2,4-butanetriol, trimethylolethane, triethylene glycol, tetraethylene glycol, polyethylene glycols, dipropylene glycol, polypropylene glycols, dibutylene glycol and polybutylene glycols. The polyesters may also contain terminal carboxyl groups. Polyesters of lactones, such as $\epsilon$-caprolactam, or hydroxy carboxylic acids, such as $\omega$-hydroxycaproic acid, may also be used.

Suitable polycarbonates containing hydroxyl groups which can be used to prepare the liquid non-ionic reaction product are those known compounds which may be obtained, for example, by reacting diols, such as 1,3-propanediol, 1,4-butanediol and/or 1,6-hexanediol, diethylene glycol, triethylene glycol or tetraethylene glycol, with diaryl carbonates, such as, diphenyl carbonate, or phosgene.

The polyester amides useful to prepare the liquid non-ionic reaction products include, for example, the predominantly linear condensates obtained from polybasic saturated and unsaturated carboxylic acids or their anhydrides and polyhydric saturated and unsaturated amino alcohols, diamines, polyamines and mixtures thereof.

The molecular weight ranges for both the polycarbonates and polyester amides are generally from 400 to 16,000 and preferably from 500 to 12,000.

As noted above, the isocyanate- and hydroxyl-containing materials are reacted in such a ratio that the resultant product has an isocyanate group content of from about 5 to about 45% by weight and preferably from about 25 to about 35% by weight. The product is then reacted with a member selected from the group consisting of polyamines containing primary and/or secondary amino groups, hydrazines, hydrazides and mixtures thereof in the presence of one or more hydroxyl-group-containing materials. The hydroxyl-groupcontaining material used to produce the dispersion of the present invention is selected from the group consisting of polyethers, polyesters, polyester amides, polycarbonates and mixtures thereof. The materials described above for producing the liquid reaction products are useful for producing the dispersion. They can be the same or different from the hydroxyl material used to produce the liquid reaction product.

Although in the reaction of the isocyanate reaction product (a) with the (b) reactant, in the presence of the hydroxyl-group-containing material, the NCO-groups react preferentially with the —NH and/or $NH_2$ groups, some of the OH groups, depending on the reaction conditions, also play their part in the reaction. This reaction results in the formation of polyurea and/or polyhydrazodicarbonamide chains which are chemically attached to molecules of the hydroxyl-containing material. Molecules of this type presumably have a dispersing effect upon the resinous particles. The extent to which the OH groups take part in the reaction is governed by the course of the reaction. If too many hydroxyl functional molecules react with the isocyanate of (a), highly viscous dispersions are obtained. If, on the other hand, the proportion of co-reacting hydroxyl functional molecules is too small, the dispersions formed are in danger of being unstable. By following the process of the instant invention, it is possible to control the NCO/OH reaction to such a degree that finely divided dispersions with the low viscosity required are formed. Additionally, the dispersions are still so stable that they do not sediment even after prolonged storage and even after storage at elevated temperatures.

The dispersions of the present invention are prepared using the techniques described in U.S. Pat. Nos. 4,042,537 and 4,089,835, the disclosures of which are hereby incorporated by reference.

Suitable polyamines useful in the instant invention include divalent and/or higher polyvalent, primary and/or secondary, aliphatic, araliphatic, cycloaliphatic, or aromatic amines. Specific examples include ethylene diamine, 1,2- and 1,3-propylene diamine, tetramethylene diamine, hexamethylene diamine, dodecamethylene diamine, trimethyl diaminohexane, N,N'-dimethyl ethylene diamine, 2,2'-bis(aminopropyl) methylamine, higher homologues of ethylene diamine, such as diethylene triamine, triethylene tetramine, and tetraethylene pentamine, homologues of propylene diamine, such as dipropylene triamine, piperazine, N,N'-bis(aminoethyl)-piperazine, triazine, 4-aminobenzylamine, 4-aminophenylethylamine, 1-amino-3,3,5-trimethyl-5-aminoethylcyclohexane, 4,4'-diaminodicyclohexylmethane and -propane, 1,4-diaminocyclohexane, phenylene diamines, naphthylene diamines, condensates of aniline and formaldehyde, tolylene diamines, bis(aminomethyl)benzenes and the derivatives of the above-mentioned aromatic amines monoalkylated on one or both nitrogen atoms. The useable polyamines will generally have molecular weights of from about 60 to about 10,000 and preferably from 60 to 3000, with the molecular weight range of from 60 to 1000 being particularly preferred.

Suitable hydrazines include hydrazine itself and mono- or N,N'-disubstituted hydrazines, the substituents being, e.g., $C_1$–$C_6$ alkyl groups, cyclohexyl groups, or phenyl groups. The hydrazines generally have a molecular weight of from 32 to 500. It is generally preferred to use hydrazine itself.

Suitable hydrazines and hydrazides useful in accordance with the instant invention include hydrazine, methyl hydrazine, ethyl hydrazine, hydrazine hydrate, propyl hydrazine, isopropyl hydrazine, butyl hydrazine, isobutyl hydrazine, tert-butyl hydrazine, butyl hydrazine, dodecyl hydrazine, phenyl hydrazine, tolyl hydrazine, benzyl hydrazine, 2-phenylethyl hydrazine, cyclohexyl hydrazine, cyclopentyl hydrazine, β-cyanoethyl hydrazine, 1,2-dimethyl hydrazine, 1,2-diethyl hydrazine, 1,2-diisobutyl hydrazine, 1-butyl-2-methyl hydrazine, hydrazobenzene, 1-benzyl-2-phenyl hydrazine, oxalyl dihydrazide, semicarbazide, carbohydrazide, 4-methyl semicarbazide, 4-phenyl semicarbazide, isophthalic acid dihydrazide, β-hydrazinopropionic acid hydrazide, thiosemicarbazide, thiocarbohydrazide, aminoguanidine, 1-aminopiperazine and 1,4-diaminopiperazine.

The useful hydrazides are generally the hydrazides of divalent or higher polyvalent carboxylic acids, such as carbonic acid, oxalic acid, malonic acid, succinic acid, adipic acid, sebacic acid, azelaic acid, maleic acid, fumaric acid, phthalic acid, isophthalic acid, and terephthalic acid; the esters of hydrazinomonocarboxylic acids with dihydric or higher polyhydric alcohols and phenols, such as ethanediol, 1,2-propanediol, 1,2-butanediol, 1,3-butanediol and 1,4-butanediol, hexanediol, diethylene glycol, triethylene glycol, tetraethylene glycol, dipropylene glycol, tripropylene glycol, and hydroquinone; and the amines of hydrazinomonocarboxylic acids (semicarbazides) with, for example, the above-mentioned diamines and polyamines. The hydrazides generally have molecular weights of from 90 to 10,000, preferably from 90 to 3000 and most preferably from 90 to 1000.

The above-mentioned amines and hydrazines are optionally used in the form of their standard commercial grade aqueous solutions.

The invention enables isocyanates and amines, hydrazines, or hydrazides with a functionality of more than two to be proportionately or exclusively used. The reaction of compounds of relatively high functionality in hydroxyl-group-containing materials does not result in the formation of solid, or at the least, very highly viscous reaction products. Instead, the reaction results once again in the formation of finely divided dispersions.

The polyaddition products obtained by the process according to the invention, dispersed in the hydroxyl-group containing material, may also be modified by the proportionate use of monofunctional isocyanates, amines, hydrazine derivatives or ammonia. For example, the average molecular weight of the polyaddition products may be adjusted by incorporating monofunctional compounds of this type. In cases where alkanolamines with primary or secondary amino groups are used, it is possible to synthesize polyureas and polyurea polyhydrazodicarbonamides containing free hydroxyl groups. It is also possible to introduce other groups, such as ester groups, relatively long aliphatic radical, tertiary amino groups, and active double bonds, by utilizing correspondingly substituted monoamines or diamines and/or isocyanates.

According to the invention, the monofunctional compounds may generally be used in proportions of up to 40 mol and more preferably in proportions of up to 25 mol (based on total isocyanate, amine, hydrazine and hydrazide content).

Suitable monofunctional isocyanates include alkyl isocyanates, such as methyl, ethyl, isopropyl, isobutyl, hexyl, lauryl, and stearyl isocyanate; chlorohexyl isocyanate; cyclohexyl isocyanate; phenyl isocyanate; tolyl isocyanate, 4-chlorophenyl isocyanate; and diisopropyl phenyl isocyanate.

Suitable monoamines include alkyl and dialkyl amines with $C_1$–$C_{18}$ alkyl groups; cycloaliphatic amines, such as cyclohexyl amine and homologues thereof; aniline and N-alkyl anilines; aniline derivatives substituted on the benzene nucleus, alkanolamines, such as ethanolamine, diethanolamine, propanolamine, dipropanolamine, butanolamine and dibutanolamine; diamines with one tertiary and one primary or secondary amino groups, such as N,N-dimethyl ethylene diamine and N-methylpiperazine. Also suitable are monofunctional hydrazine derivatives and hydrazides of monocarboxylic acids, hydrazine monocarboxylic acid esters of monofunctional alcohols or phenols, and semicarbazides, such as methyl, ethyl, propyl, butyl, hexyl, dodecyl, stearyl, phenyl, and cyclohexyl semicarbazide.

It is also possible to include in the hydroxyl-group-containing material used as dispersing agents in the production of the dispersions. Relatively low molecular weight glycols and polyols having molecular weights up to 400 can be employed. Suitable low molecular weight polyols are the diols and triols generally known from polyurethane chemistry as chain extenders and crosslinkers, such as 1,2- and 1,3-propylene glycol, 1,4- and 2,3-butylene glycol, 1,6-hexanediol, 1,8-octanediol, neopentyl glycol, cyclohexane dimethanol, 2-methyl-1,3-propanediol, glycerol, trimethylolpropane, 1,2,6-hexanetriol, 1,2,4-butanetriol, or trimethylolethane, but glycols with hydrophilic character, such as ethylene glycol, diethylene glycol, triethylene glycol and dipropylene glycol are preferred. In addition, however, it is also possible to use compounds, such as dibutylene glycol, thiodiglycol and castor oil, in component (c). Ester diols corresponding to one of the following general formulas are also useful:

HO—(CH$_2$)$_x$—CO—O—(CH$_2$)$_y$—OH and

HO—(CH$_2$)$_x$—O—CO—R—CO—O—(CH$_2$)$_x$OH wherein
R represents an alkylene or arylene radical having from 1 to 10 carbon atoms and preferably having from 2 to 6 carbon atoms,
x is a number of from 2 to 6 and
y is a number of from 23 to 5.

Specific examples include δ-hydroxy butyl-E-hydroxy caproic acid ester, ω-hydroxy hexyl-γ-hydroxy butyric acid ester, adipic acid bis(β-hydroxyethyl) ester and terephthalic acid bis(β-hydroxyethyl) ester. Diol urethanes corresponding to the following general formula are also useful:

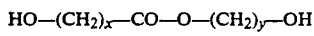
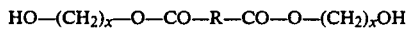

wherein
R' represents an alkylene, cycloalkylene, or arylene radical having from 2 to 15 carbon atoms and preferably having from 2 to 6 carbon atoms, and
x is an integer of from 2 to 6.

Examples include 1,6-hexamethylene bis(β-hydroxyethyl urethane) or 4,4'-diphenylmethane bis(β-hydroxybutyl urethane).

Even diol ureas corresponding to the following general formula are useful:

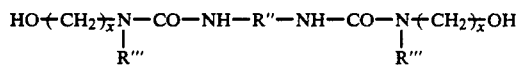

wherein
R" represents an alkylene, cycloalkylene, or arylene radical having from 2 to 15 carbon atoms and preferably having from 2 to 9 carbon atoms,
R''' represents H or CH$_3$ and
x is 2 or 3.

Examples include 4,4'-diphenylmethane bis-(8-hydroxyethyl urea) or the compound

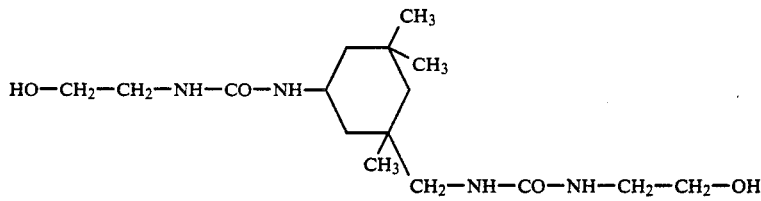

Particularly suitable low molecular weight dihydric and trihydric alcohols are those which, in admixture with the relatively high molecular weight polyethers, give a dispersant (component (c) in the process according to the present invention) which is liquid below 50° C. The viscosity of the reaction mixture in the through-flow mixers at the reaction temperature is generally below 2000 cP, preferably below 1000 cP and most preferably in the range of from 100 to 500 cP.

The molecular weight of the products formed in dispersion in hydroxyl containing material is determined by the quantitative ratio between polyamine, hydrazine, or hydrazide on the one hand and the isocyanate content of the reaction product on the other hand (and by the monofunctional compounds used, if any). It is particularly preferred to react substantially equivalent quantities of isocyanates and NH-functional compounds in the hydroxyl-group-containing material. However, it is also possible to use an excess of isocyanate. In general, an NCO/NH ratio of from 0.80 to 1.35, more preferably from 0.90 to 1.35, and most preferably from 1.051 to 1.30, is maintained.

The concentration of the polyaddition products of the dispersion based on the hydroxyl-group-containing material may vary within wide limits, although it is generally from 1 to 45% by weight, more preferably from 20 to 40% by weight.

The reaction of the component starting materials can be conducted by a continuous or batch process. In general, the reaction components are introduced into a flow mixer of the type generally known in the art at room temperature. If desired, the hydroxyl-containing material may be introduced at a slightly elevated temperature (for example, 40° to 50° C.) to reduce the viscosity for ease of pumping and more efficient mixing. The reaction temperature may rise to from 50° to 150° C. under the effect of the shear forces generated when a dynamic mixer is used and under the effect of the heat of the polyaddition reaction generated, depending upon the quantity of resinous solids. In general, however, it is best to keep the temperature below 110° C. (optionally by cooling the mixer) because otherwise any water which may be present evaporates and can give rise to disturbances as a result of bubble formation. In cases where hydrazine is used, it is important to ensure that the decomposition temperature of hydrazine is not exceeded.

The polyaddition reaction of polyisocyanates and polyamines, hydrazines, or hydrazides can be carried out in higher-performance continuous flow mixers with average residence times of from about 1 second up to 10 minutes and preferably from 2 seconds to 3 minutes.

The homogenization or dispersion time should only amount to at most 10% of the average residence time, in order to obtain thorough admixture of the components. It is possible, although not essential, to arrange two or even more flow mixers one behind the other. The times quoted above then apply logically to the mixer system as a whole.

Flow mixers are known and divided into two groups, namely static mixers with fixed fittings and dynamic mixers with movable fittings operating on the rotor-stator principle. They may optionally be heated or cooled. With static mixers, the mixing energy required is applied through pumps, whereas with dynamic mixers, a separate motor drives the rotor.

In every case, the dispersing effect and, hence the particle size in the dispersion, is governed by the energy applied and the shear forces correspondingly generated.

Static mixers may be divided into the following groups:

(a) Mixers with simple fittings (see, e.g., U.S. Pat. No. 3,286,992, German Offenlegungsschrift No. 2,119,293, and U.S. Pat. No. 3,704,006).

(b) Multi-channel mixers (for example, the AMK-Ross-ISG Mixers manufactured by Aachener Misch-und Knetmaschinen-Fabrik, West Germany).

(c) So-called packing mixers, for example, the static mixers manufactured by Sulzer AG (Winterthur, Switzerland) and the BKM-Mixers manufactured by Bayer AG (West Germany). (See, e.g., U.S. Pat. No. 3,785,620 and German Offenlegungsschrift No. 2,328,795, corresponding to U.S. Serial Number 474,836, respectively).

(d) Further variants of static mixers, such as mixing nozzles, for example, those manufactured by the Lechler Company (Stuttgart, West Germany) or the mixing chambers in the HK-machines manufactured by the Hennecke Company (Birlinghofen, West Germany) into which the starting products are injected under high pressure (counter-current injection).

Dynamic mixers suitable for use in the process according to the invention include the flow mixers manufactured by the companies Ekato RMT (Schopfheim, West Germany), Lightnin (Neu-Isenburg, West Germany), and Hennecke (toothed stirrer) which, like the known impeller-type homogenizing machines, operate on the stator-rotor principle but cannot be used to perform feed or delivery functions. The energy required for dispersion, in general, amounts to from 1 to more than 10 kW per liter of mixer volume depending upon the required particle size, the type of mixer used, and the viscosity of the starting materials.

In cases where anhydrous amines, hydrazines and hydrazides are used, there is no need for any further workup upon completion of the polyaddition reactions. However, in cases where aqueous amines (for example, aqueous ethylene diamine solution or hydrazine hydrate) are used, it is advisable in some cases to remove the water from the dispersion in vacuo.

In general, the process according to the invention is carried out by introducing the three components (i.e., hydroxyl-group-containing material, NH-component and liquid isocyanate product) from separate supply vessels through metering pumps into the flow mixer in which they are thoroughly mixed and in which, at the same time, most of the polyaddition reaction takes place. However, it is also possible to combine the amine component with the hydroxyl-group-containing component before introduction into the flow mixer. The substantially reacted product is then introduced into a receiver in which it is optionally stirred to complete the reaction, optionally with heating to form 50° to 150° C. In cases where aqueous amines are used, the end products are, if desired, freed in vacuo from the water present in them.

Additives, such as activators, stabilizers, water, blowing agents, flameproofing agents, and pigment pastes, may be added to the dispersions prepared by the process according to the invention either during or after the reaction.

The dispersions prepared by the process according to the invention may be processed, for example, into soft, semi-hard and hard polyurethane foams with improved properties, such as load bearing and cell opening. The dispersions are also suitable for the production of, for example, elastomers, coverings, and coatings based on polyurethanes.

In the production of the foams, the other starting materials useful herein are aliphatic, cycloaliphatic, araliphatic, aromatic, and heterocyclic polyisocyanates of the type previously described.

According to the invention, water and/or readily volatile organic substances are used as blowing agents. Suitable organic blowing agents include acetone, ethyl acetate, halogen-substituted alkanes, such as methylene chloride, chloro form, ethylidene chloride, vinylidene chloride, monofluorotrichloromethane, chloridifluoromethane, and dichlorodifluoromethane, butane, hexane, heptane, diethyl ether, and the like. A blowing effect may also be obtained by adding compounds such as azo compounds, which decompose at temperatures above room temperature to give off gases (such as nitrogen). A suitable azo-compound is azoisobutyronitrile. Further examples of blowing agents and information on the use of blowing agents may be found in Kunststoff-Handbuch Vol. VII, Vieweg and Hochtlen, Carl-Hanser-Verlag, Munich, 1966 pages 108 and 109, 453 to 455, and 507–510.

In many cases, catalysts are also used in producing the foams in accordance with the invention. Suitable known catalysts include tertiary amines, such as triethylamine, tributylamine, N-methyl morpholine, N-ethyl morpholine, N-cocomorpholine, N,N,N',N'-tetramethyl ethylene diamine, 1,4-diazabicyclo[2.2.2]octane, N-methyl-N'-dimethyl aminoethyl piperazine, N,N-dimethylbenzylamine, bis(N,N-diethylaminoethyl) adipate, N,N-diethylbenzylamine, pentamethyl diethylene triamine, N,N'-dimethylcyclohexylamine, N,N,N',N'-tetramethyl-1,3-butanediamine, N,N-dimethyl-βphenylethylamine, 1,2-dimethylimidazole, and 2-methylimidazole. Other suitable catalysts are known Mannich bases of secondary amines, such as dimethylamine, and aldehydes, preferably formaldehyde, or ketones, such as acetone, methyl ethyl ketone, cyclohexanone, and phenols, such as phenol, nonylphenol, and bis-phenol.

Tertiary amines containing isocyanate-reactive hydrogen atoms may also be used as catalysts and include triethanolamine, triisopropanolamine, N,N-dimethylethanolamine, as well as their reaction products with alkylene oxides, such as propylene oxide and/or ethylene oxide.

Other suitable catalysts are silaamines with carbon-silicon bonds of the type described, for example, in U.S. Pat. No. 3,620,984. Examples include 2,2,4-trimethyl-2-silamorpholine and 1,3-diethylaminomethyl tetramethyldisiloxane.

It is also possible to use catalysts and nitrogen-containing bases, such as tetraalkylammonium hydroxides; alkali metal hydroxides, such as sodium hydroxide, alkali metal phenolates, such as sodium phenolates, or alkali metal alcoholates, such as sodium methylate. Hexahydrotriazines may also be used as catalysts.

According to the invention, organometallic compounds and more especially organotin compounds may also be used as catalysts. Preferred organotin compounds include tin(II) salts of carboxylic acids, such as tin(II) acetate, tin(II) octoate, tin(II) ethylhexoate and tin(II) laurate, and tin(IV) compounds, such as dibutyltin oxide, dibutyltin dichloride, dibutyltin diacetate, dibutyltin dilaurate, dibutyltin maleate, or dioctyltin diacetate. It is of course, possible to use any of the above-mentioned catalysts in the form of mixtures.

Further representatives of catalysts suitable for use in accordance with the invention and information on the way in which they work may be found in Kunststoff-Handbuch, Vol. VII, by Vieweg and Hochtlen, Carl-Hanser-Verlag, Munich, 1966, for example, on pages 96 to 102.

The catalysts are generally used in a quantity of from 0.001 to 10% by weight, based on the quantity of the high molecular weight compounds according to the invention.

According to the invention, it is also possible to use surface-active additives, such as emulsifiers and foam stabilizers. Examples of suitable emulsifiers include sodium salts of castor oil sulfonates or salts of fatty acids with amines, such as diethylamine oleate or diethanolamine stearate. Alkali metal or ammonium salts of sulfonic acids, for example, of dodecyl benzenesulfonic acid or dinaphthyl methanedisulfonic acid, or of fatty acids, such as ricinoleic acid or of polymeric fatty acids, may also be used as surface-active additives.

Suitable foam stabilizers include polyether siloxanes, especially those which are water soluble. The compounds are generally synthesized in such a way that a copolymer of ethylene oxide and propylene oxide is attached to a polydimethylsiloxane radical. Foam stabilizers of this type are described, for example, in U.S. Pat. Nos. 2,834,748, 2,917,480, and 3,629,308.

According to the invention, it is also possible to use reaction retarders such as acid-reacting substances (e.g., hydrochloric acid or organic acid halides); cell regulators, such as paraffins, fatty alcohols or dimethyl polysiloxanes; pigments or dyes; flameproofing agents, such as tris(chloroethyl) phosphate, tricresyl phosphate or ammonium phosphate and polyphosphates; stabilizers against aging and weathering; plasticizers; fungistatic and bacteriostatic compounds; and fillers, such as barium sulphate, kieselguhr, carbon black, or whiting.

Other examples of surface-active additives, foam stabilizers, cell regulators, reaction retarders, stabilizers, flameproofing agents, plasticizers, dyes, fillers, and fungistatic and bacteriostatic compounds, optionally used in accordance with the invention, and also details on how additives of this type are used and the way in which they work may be found in Kunststoff-Handbuch, Vol. VII, Vieweg and Hochtlen, Carl-Hanser-Verlag, Munich, 1966 pages 103-113.

According to the invention, the reaction components may be reacted by the known one-stage process, by the prepolymer process, or by the semi-prepolymer process, in many cases using machines, for example, those of the type described in U.S. Pat. No. 2,764,565. Particulars of processing machines which may also be used in accordance with the invention may be found in Kunststoff-Handbuch, Vol. VII, Vieweg and Hochtlen, Carl-Hanser-Verlag, Munich 1966, pages 121 to 205.

According to the invention, the foams are often produced by foaming in molds. To this end, the reaction mixture is introduced into a mold. Suitable mold materials include metals (for example, aluminum) or plastics (for example, epoxide resin). In the mold, the foamable reaction mixture foams and forms the molding. In-mold foaming may also be carried out in such a way that the molding has a compact skin and a cellular core. According to the invention, it is possible in this connection to introduce into the mold a quantity of foamable reaction mixtures such that the foam formed just fills the mold. However, it is also possible to introduce into the mold more foamable reaction mixture than is required to fill the interior of the mold with foam. This technique is known as "over-charging" and is described, for example, in U.S. Pat. Nos. 3,178,490 and 3,182,104.

In many cases, "external release agents" such as silicone oils, are used during in-mold foaming. However, it is also possible to use so-called "internal release agents", optionally in admixture with external release agents, as described, for example, in German Offenlegungsschriften 2,121,670 and 2,307,589.

Cold-hardening foams may also be produced in accordance with the invention (cf. British Patent No. 1,162,517 and German Offenlegungsschrift No. 2,153,086).

It is further possible to produce foams by block foaming or by the known double conveyor belt process.

The foams produced by the process according to the invention may be used, for example, as upholstery materials, mattresses, packaging materials, shock-absorbing motor-vehicle components, films for laminating purposes, and as insulating materials. The highly flexible foams produced by the process according to the invention are particularly suitable for flame lamination with films, woven fabrics, and knitted fabrics of natural and synthetic materials. Films of these foams may also be effectively welded by high-frequency and ultrasonic welding. The hard polyurethane foams produced are also suitable for the production of articles with an integral structure or for the production of sandwich elements. The foams may be produced by the in-mold foaming process or may be obtained by fabrication from block-foamed materials. They may be processed by deep-drawing, stamping, or hot-forming.

The invention is further illustrated, but is not intended to be limited by the following examples, in which all parts and percentages are by weight unless otherwise specified.

EXAMPLES

Example 1

The dispersion is prepared by introducing two flow streams concurrently into the mixing zone of a toothed stirrer (internal volume of 0.5 l) turning at 5000 rpm. The first stream consists of 1650 parts/min of a polyether polyol (temp. 40° C.) prepared from propylene oxide, ethylene oxide, and glycerine (hydroxyl number 35, approx. 80% primary OH groups; weight ratio of PO to EO was about 5:1) and 310 parts/min of toluene diisocyanate (80% 2,4- and 20% 2,6-isomer mixture) previously mixed by pumping the combined components through a static mixer. Stream two is 3300 parts/min of the same polyether polyol (temp. 40° C.) of stream one mixed in a static mixer with 98.9 parts/min of hydrazine monohydrate.

The residence time in the toothed mixer was 6 seconds where the reaction mixture reached a temperature of 101° C. The dispersion exited the mixer into a vessel where it was stirred for approximated 30 minutes at a temperature of 80° to 100° C. The resulting dispersion had a viscosity of 1230 mPa.s 25° C., an OH number of 33, and a water content of 0.66%.

Example 2

The dispersion is prepared by introducing two flow streams concurrently into the mixing zone of a toothed stirrer (internal volume of 0.5 l) turning at 5000 rpm. The first stream consists of 1650 parts/min of a polyether polyol of example 1 (temp. 40° C.) and 310 parts/min of toluene diisocyanate (80% 2,4- and 20% 2,6-isomer mixture) previously mixed by pumping the combined components through a static mixer. Stream two is 3300 parts/min of the same polyether polyol (temp. 40° C.) of stream one combined in a static mixer with 89.0 parts/min of hydrazine monohydrate.

The residence time in the toothed mixer was 6 seconds where the reaction mixture reached a temperature of 99° C. The dispersion exited the mixer into a vessel where it was stirred for approximated 30 minutes at a temperature of 80° to 100° C. The resulting dispersion had a viscosity of 1358 mPa.s 25° C., an OH number of 33, and a water content of 0.68%.

Example 3

The subject filled polyol is prepared by introducing two flow streams concurrently into the mixing zone of a toothed stirrer (internal volume of 0.5 l) turning at 5000 rpm. The first stream consists of 1650 parts/min of a polyether polyol of example 1 (temp. 40° C.) and 320 parts/min of toluene diisocyanate (80% 2,4- and 20% 2,6-isomer mixture) previously mixed by pumping the combined components through a static mixer. Stream two is 3300 parts/min of the same polyether polyol (temp. 40° C.) of stream one combined in a static mixer with 83.6 parts/min of hydrazine monohydrate.

The residence time in the toothed mixer was 6 seconds where the reaction mixture reached a temperature of 99° C. The dispersion exited the mixer into a vessel where it was stirred for approximated 30 minutes at a temperature of 80° to 100° C. A portion of the water present was then distilled off in vacuo at 100° C. The resulting dispersion had a viscosity of 2060 mPa.s 25° C., an OH number of 33, and a water content of 0.38%.

Example 4

The subject filled polyol is prepared by introducing two flow streams concurrently into the mixing zone of a toothed stirrer (internal volume of 0.5 l) turning at 5000 rpm. The first stream consists of 1450 parts/min of a polyether polyol of example 1 (temp. 40° C.) and 446 parts/min of toluene diisocyanate (80% 2,4- and 20% 2,6-isomer mixture) previously mixed by pumping the combined components through a static mixer. Stream two is 2900 parts/min of the same polyether polyol (temp. 40° C.) of stream one combined in a static mixer with 142.5 parts/min of hydrazine monohydrate.

The residence time in the toothed mixer was 6 seconds where the reaction mixture reached a temperature of 115° C. The dispersion exited the mixer into a vessel where it was stirred for approximated 30 minutes at a temperature of 80° to 100° C. A portion of the water present was then distilled off in vacuo at 100° C. The resulting dispersion had a viscosity of 1416 mPa.s 25° C., an OH number of 31, and a water content of 0.11%.

Example 5

The subject filled polyol is prepared by introducing two flow streams concurrently into the mixing zone of a toothed stirrer (internal volume of 0.5 l) turning at 5000 rpm. The first stream consists of 1450 parts/min of a polyether polyol of example 1 (temp. 40° C.) and 454 parts/min of toluene diisocyanate (80% 2,4- and 20% 2,6-isomer mixture) previously mixed by pumping the combined components through a static mixer. Stream two is 2900 parts/min of the same polyether polyol (temp. 40° C.) of stream one combined in a static mixer with 130.5 parts/min of hydrazine monohydrate.

The residence time in the toothed mixer was 6 seconds where the reaction mixture reached a temperature of 114° C. The dispersion exited the mixer into a vessel where it was stirred for approximated 30 minutes at a temperature of 80° to 100° C. A portion of the water present was then distilled off in vacuo at 100° C. The resulting dispersion had a viscosity of 1676 mPa.s 25° C., an OH number of 31, and a water content of 0.14%.

Example 6

The subject filled polyol is prepared by introducing two flow streams concurrently into the mixing zone of a toothed stirrer (internal volume of 0.5 l) turning at 5000 rpm. The first stream consists of 1450 parts/min of a polyether polyol of example 1 (temp. 40° C.) and 460.6 parts/min of toluene diisocyanate (80% 2,4- and 20% 2,6-isomer mixture) previously mixed by pumping the combined components through a static mixer. Stream two is 2900 parts/min of the same polyether polyol (temp. 40° C.) of stream one combined in a static mixer with 120.3 parts/min of hydrazine monohydrate.

The residence time in the toothed mixer was 6 seconds where the reaction mixture reached a temperature of 112° C. The dispersion exited the mixer into a vessel where it was stirred for approximated 30 minutes at a temperature of 80° to 100° C. A portion of the water present was then distilled off in vacuo at 100° C. The resulting dispersion had a viscosity of 2740 mPa.s @ 25° C., an OH number of 31, and a water content of 0.12%.

TABLE 1

| | FORMULATION A (CONSTANT 11% SOLIDS IN FOAM) | | | | FORMULATION B (CONSTANT 7% SOLIDS IN FOAM) | | | | FORMULATION C (CONSTANT 7% SOLIDS IN FOAM) | |
|---|---|---|---|---|---|---|---|---|---|---|
| EXAMPLE | 7 | 8 | 9 | 10 | 11 | 12 | 13 | 14 | 15 | 16 |
| Dispersion A-1 | 55 | — | — | — | 35 | — | 35 | — | — | — |
| Dispersion A-2 | — | 100 | — | — | — | — | — | — | — | — |
| Dispersion A-3 | — | — | 100 | — | — | — | — | — | — | — |
| Dispersion A-4 | — | — | — | 100 | — | — | — | — | — | — |
| Dispersion A-5 | — | — | — | — | — | — | — | 100 | — | — |
| Dispersion A-6 | — | — | — | — | — | 100 | — | — | 100 | — |
| Dispersion A-7 | — | — | — | — | — | — | — | — | — | 100 |
| Polyether Polyol | 45 | — | — | — | 65 | — | 65 | — | — | — |
| Water | 3.5 | | | | | | 4.0 | | | |
| DEOA | 1.7 | | | | | | | | | |
| DABCO 33LV | 0.6 | | | | | | | | | |
| A-107 | 0.4 | | | | | | | | | |
| DC-5043 | 1.75 | | | | | | | | | |

A-1: A stable dispersion with a 20% solids content of polyureas and/or polyhydrazodicarbonamides in a glycerine started polyether polyol of polypropylene oxide and ethylene oxide with an OH number of 28 and a primary OH group content of approximately 80% based on total OH content of polyether.

A-2: The stable dispersion of example 4 having a 11% solids content of polyureas and/or polyhydrazodicarbonamides in a glycerine started polyether polyol of polypropylene oxide and ethylene oxide with an OH number of 31 and a primary OH group content of approximately 80% based on total OH content of polyether.

A-3: The stable dispersion of example 5 having a 11% solids content of polyureas and/or polyhydrazodicarbonamides in a glycerine started polyether polyol of polypropylene oxide and ethylene oxide with an OH number of 31 and a primary OH group content of approximately 80% based on total OH content of polyether.

A-4: The stable dispersion of example 6 having a 11% solids content of polyureas and/or polyhydrazodicarbonamides in a glycerine started polyether polyol of polypropylene oxide and ethylene oxide with an OH number of 31 and a primary OH group content of approximately 80% based on total OH content of polyether.

A-5: The stable dispersion of example 1 having a 7% solids content of polyureas and/or polyhydrazodicarbonamides in a glycerine started polyether polyol of polypropylene oxide and ethylene oxide with an OH number of 33 and a primary OH group content of approximately 80% based on total OH content of polyether.

A-6: The stable dispersion of example 2 having a 7% solids content of polyureas and/or polyhydrazodicarbonamides in a glycerin started polyether polyol of polypropylene oxide and ethylene oxide with an OH number of 33 and a primary OH group content of approximately 80% based on total OH content of polyether.

A-7: The stable dispersion of example 2 having a 7% solids content of polyureas and/or polyhydrazodicarbonamides in a glycerine started polyether polyol of polypropylene oxide and ethylene oxide with an OH number of 33 and a primary OH group content of approximately 80% based on total OH content of polyether.

(b) A glycerine started polyether polyol of polypropylene oxide and ethylene oxide with an OH number of 35 and a primary OH group content of approximately 80% based on total OH content of polyether.

(c) diethanolamine, a crosslinker/curing agent by Union Carbide Corp.

(d) Triethylenediamine, a tertiary amine catalyst by Air Products Inc.

(e) A formate salt of bis[2-(dimethylamino)ethyl] ether, a tertiary amine catalyst by Union Carbide Corp.

(f) Dimethylpolysiloxane polyalkylene oxide copolymer foam stabilizer from Dow Corning Corp.

(g) 80/20 mixture of 2,4 and 2,6 toluene diisocyanate isomers by Miles Inc.

Foams were prepared by first pre-mixing all of the above components of Table 1 except the MONDUR TD-80 which was then added to the premix according to the isocyanate index mentioned above. The reacting mixture was dispensed into a 10 in. × 9 in. × 3.5 in. aluminum mold which had been heated to a temperature of between 145 and 150 degrees F. The reacting mixture foamed to take the form of the mold, at which time the mold with reacting mixture was placed in an oven set to a temperature of 250 degrees Farenheit. After three (3) minutes the finished foam was removed from the mold and physically crushed so as to ensure that all cells were opened. The foams were post cured at 250 degrees Farenheit for 30 minutes. The foams were further post cured at room temperature for seven (7) days before they were evaluated for physical properties as reported in Table 2.

TABLE 2

| | PHYSICAL PROPERTIES | | | | | | |
|---|---|---|---|---|---|---|---|
| EXAMPLE | a ILD 50R (+1 − 7 N) | b ILD % CHANGE | c TENS. KPA | d ELON. % | e TEAR N/m | f COMP. S 50 ORIG | g CLD 50R |
| FORMULATION A | | | | | | | |
| 7 | 211 | | 159 | 93 | 280 | 12.7 | 4.25 |
| 8 | 233 | +10 | 140 | 93 | 263 | 11.6 | 4.66 |

TABLE 2-continued

PHYSICAL PROPERTIES

| EXAMPLE | a<br>ILD<br>50R<br>(+1 − 7 N) | b<br>ILD %<br>CHANGE | c<br>TENS.<br>KPA | d<br>ELON.<br>% | e<br>TEAR<br>N/m | f<br>COMP. S<br>50 ORIG | g<br>CLD<br>50R |
|---|---|---|---|---|---|---|---|
| 9 | 236 | +11.3 | 157 | 94 | 289 | 12.5 | 4.82 |
| 10 | 232 | +9.4 | 138 | 91 | 254 | 12.3 | 4.57 |
| FORMULATION B | | | | | | | |
| 11 | 182 | | 136 | 109 | 202 | 10.0 | 3.99 |
| 12 | 203 | +11.5 | 132 | 105 | 202 | 9.0 | 4.69 |
| FORMULATION C | | | | | | | |
| 13 | 177 | | 148 | 109 | 210 | 12.6 | 3.74 |
| 14 | 191 | +8 | 142 | 102 | 201 | 12.4 | 4.32 |
| 15 | 199 | +12 | 146 | 103 | 254 | 15.6 | 4.36 |
| 16 | 194 | +11 | 134 | 111 | 236 | 14.2 | 4.10 | a Indentation Force Deflection Test - Specified deflection-D3574 Test B₁ (ILD, 50%).
b Indentation Force Deflection Change - (Compared to Example 1).
c Tension Test - (ASTM D-3574) Test E.
d Ultimate Elongation - ASTM D-3574 Test E.
e Tear Resistance Test - ASTM D-3574 Test F.
f Constant Deflection Compression Set - ASTM D-3574 Test D.
g Compression Force Deflection Test - ASTM D-3574 Test C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An improved process for preparing foams comprising reacting a polyisocyanate with a dispersion of polyurea and/or polyhydrazodicarbonamide in a hydroxyl-group containing material dispersing agent wherein the dispersion is prepared by reacting:

(a) an organic polyisocyanate with (b) a member selected from the group consisting of (i) a polyamine containing primary and/or secondary amino groups, (ii) a hydrazine, (iii) a hydrazide, and (iv) a mixture thereof, in (c) a hydroxyl-group-containing material wherein the hydroxyl group is secondary in an instance when (b) contains a primary hydroxyl group; the improvement wherein said dispersion contains from 1 to 19% by weight of in situ formed low solids content.

2. The process of claim 1 wherein the solids content of the dispersion is from 7 to 11 percent by weight.

* * * * *